US012095921B2

(12) United States Patent
Wagner et al.

(10) Patent No.: US 12,095,921 B2
(45) Date of Patent: *Sep. 17, 2024

(54) AUTHENTICATION SYSTEM USING SECURE MULTI-PARTY COMPUTATION

(71) Applicant: Visa International Service Association, San Francisco, CA (US)

(72) Inventors: Kim R. Wagner, Sunnyvale, CA (US); John F. Sheets, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,386

(22) Filed: Jul. 25, 2022

(65) Prior Publication Data
US 2022/0360449 A1  Nov. 10, 2022

Related U.S. Application Data

(63) Continuation of application No. 16/478,041, filed as application No. PCT/US2017/024099 on Mar. 24, 2017, now Pat. No. 11,431,504.

(51) Int. Cl.
*H04L 9/32* (2006.01)
*G06F 21/31* (2013.01)
*H04L 9/40* (2022.01)

(52) U.S. Cl.
CPC ........... *H04L 9/3231* (2013.01); *G06F 21/31* (2013.01); *H04L 9/3236* (2013.01);
(Continued)

(58) Field of Classification Search
CPC . H04L 9/3231; H04L 9/3236; H04L 63/0861; H04L 2209/46; H04L 2209/50;
(Continued)

(56) References Cited

U.S. PATENT DOCUMENTS 7,602,904 B2 * 10/2009 Juels ...................... H04L 9/304
380/28
8,190,901 B2 * 5/2012 Barr .................. H04N 1/32304
382/116
(Continued)

FOREIGN PATENT DOCUMENTS

CN      101297534 A     10/2008
CN      103679436 A      3/2014
(Continued)

OTHER PUBLICATIONS

Li et al., Minutiae Matching with Privacy Protection Based on the Combination of Garbled Circuit and Homomorphic Encryption, Scientific World Journal, 2014.*
(Continued)

*Primary Examiner* — David Garcia Cervetti
(74) *Attorney, Agent, or Firm* — Kilpatrick Townsend & Stockton LLP

(57) ABSTRACT

The invention is directed to a system that enables an authentication process that involves secure multi-party computation. The authentication process can be performed between a user device operated by a user and an access device. The user device and the access device may conduct the authentication process such that enrollment information and authentication information input by the user is not transmitted between the devices. Instead, the user device may determine and utilize obfuscated values associated with the authentication information. The user device may also determine an obfuscated authentication function that can be utilized to determine an authentication result without revealing enrollment information and authentication information associated with the user. The user can be authenticated based on the authentication result.

20 Claims, 7 Drawing Sheets

(52) U.S. Cl.
CPC ...... *H04L 63/0861* (2013.01); *H04L 2209/16* (2013.01); *H04L 2209/46* (2013.01); *H04L 2209/50* (2013.01)

(58) Field of Classification Search
CPC ........... H04L 2209/16; H04L 2209/046; G06F 21/125; G06F 21/31
See application file for complete search history.

(56) References Cited

U.S. PATENT DOCUMENTS

| | | | | |
|---|---|---|---|---|
| 9,847,997 | B2* | 12/2017 | Wagner | G06F 21/32 |
| 10,007,615 | B1* | 6/2018 | Gazit | G06F 12/0888 |
| 10,243,738 | B2* | 3/2019 | Chase | H04L 9/088 |
| 10,460,774 | B2* | 10/2019 | Lee | G06F 13/1684 |
| 10,826,685 | B1* | 11/2020 | Campagna | H04L 9/3247 |
| 11,062,042 | B1* | 7/2021 | McKervey | G06F 16/137 |
| 11,431,504 | B2 | 8/2022 | Wagner et al. | |
| 11,876,677 | B1* | 1/2024 | Golikov | H04L 67/06 |
| 2003/0204743 | A1* | 10/2003 | Devadas | G06F 21/72 257/E23.179 |
| 2004/0104266 | A1* | 6/2004 | Bolle | G07C 9/37 235/382 |
| 2004/0230797 | A1* | 11/2004 | Ofek | H04L 63/12 713/168 |
| 2008/0021899 | A1* | 1/2008 | Avidan | G06F 18/24147 |
| 2010/0100724 | A1* | 4/2010 | Kaliski, Jr. | H04L 9/3226 713/171 |
| 2010/0246812 | A1* | 9/2010 | Rane | H04L 9/321 380/28 |
| 2010/0303230 | A1* | 12/2010 | Taveau | G06F 21/35 340/10.42 |
| 2010/0306076 | A1* | 12/2010 | Taveau | G06Q 20/3229 705/26.8 |
| 2010/0306107 | A1* | 12/2010 | Nahari | H04L 63/126 235/375 |
| 2010/0306531 | A1* | 12/2010 | Nahari | H04L 9/3218 713/156 |
| 2010/0306819 | A1* | 12/2010 | Nahari | H04L 63/168 726/2 |
| 2011/0026781 | A1* | 2/2011 | Osadchy | G06V 40/16 382/118 |
| 2011/0126024 | A1 | 5/2011 | Beatson et al. | |
| 2012/0086550 | A1* | 4/2012 | LeBlanc | G07C 9/37 340/5.82 |
| 2012/0169460 | A1* | 7/2012 | Thumparthy | G07C 9/00563 340/5.52 |
| 2012/0239926 | A1* | 9/2012 | Armstrong | H04L 9/3278 713/155 |
| 2013/0019092 | A1 | 1/2013 | Levow | |
| 2013/0243187 | A1* | 9/2013 | Horstmeyer | G09C 1/00 380/28 |
| 2014/0040620 | A1* | 2/2014 | Kolesnikov | G09C 1/00 713/171 |
| 2014/0281567 | A1* | 9/2014 | Rane | H04L 9/3231 713/186 |
| 2014/0372769 | A1* | 12/2014 | Kerschbaum | H04L 9/008 713/189 |
| 2015/0007258 | A1* | 1/2015 | Patey | G06V 40/10 726/1 |
| 2015/0295925 | A1* | 10/2015 | Patey | H04L 63/0861 713/186 |
| 2015/0349958 | A1* | 12/2015 | Lindell | G06F 21/31 713/168 |
| 2016/0019211 | A1* | 1/2016 | Patey | H04L 9/00 707/747 |
| 2016/0026825 | A1* | 1/2016 | Patey | G06V 40/10 726/26 |
| 2016/0110583 | A1* | 4/2016 | Kuo | G06V 40/1371 382/125 |
| 2016/0127289 | A1* | 5/2016 | Papa | G06Q 30/0255 709/206 |
| 2016/0164682 | A1* | 6/2016 | Hartloff | G06V 40/50 713/186 |
| 2016/0255054 | A1 | 9/2016 | Wan et al. | |
| 2016/0337123 | A1* | 11/2016 | Seok | H04L 9/0869 |
| 2017/0033934 | A1* | 2/2017 | Camenisch | H04L 9/3263 |
| 2017/0076639 | A1* | 3/2017 | Yasuda | G09C 1/00 |
| 2017/0083694 | A1* | 3/2017 | Mardikar | G06V 40/28 |
| 2017/0093851 | A1* | 3/2017 | Allen | H04L 9/3263 |
| 2017/0222798 | A1* | 8/2017 | Morel | H04L 9/30 |
| 2017/0236123 | A1* | 8/2017 | Ali | G06Q 20/3825 705/75 |
| 2017/0243225 | A1* | 8/2017 | Kohli | G06Q 20/40145 |
| 2018/0019868 | A1* | 1/2018 | Pe'er | H04L 63/061 |
| 2018/0019997 | A1* | 1/2018 | Chabanne | H04L 63/0861 |
| 2018/0144112 | A1* | 5/2018 | Pitel | G06F 21/14 |
| 2018/0240100 | A1* | 8/2018 | Leleu | G06Q 20/4012 |
| 2018/0359082 | A1* | 12/2018 | Bos | H04L 9/0631 |
| 2019/0018936 | A1* | 1/2019 | Zhou | H04L 9/3239 |
| 2019/0205558 | A1* | 7/2019 | Gonzales, Jr. | G06F 21/602 |
| 2019/0372771 | A1* | 12/2019 | Wagner | H04L 9/3231 |
| 2020/0242039 | A1* | 7/2020 | Shani | H04L 9/0643 |
| 2021/0280536 | A1* | 9/2021 | Kuenemund | G06F 21/75 |
| 2021/0342318 | A1* | 11/2021 | Sanders | H04L 9/0643 |
| 2022/0222590 | A1* | 7/2022 | Wang | G06Q 30/0206 |
| 2023/0274013 | A1* | 8/2023 | Madan | G06F 11/1453 726/26 |
| 2023/0336339 | A1* | 10/2023 | Karadigudda | H04L 9/0894 |

FOREIGN PATENT DOCUMENTS

| | | | |
|---|---|---|---|
| CN | 104754737 A | 7/2015 | |
| GB | 2588812 A * | 5/2021 | ............ H04L 63/12 |
| KR | 1020120138582 A | 12/2012 | |
| WO | 2017075063 A1 | 5/2017 | |

OTHER PUBLICATIONS

Luo et al., An Efficient Protocol for Private Iris-Code Matching by Means of Garbled Circuits, IEEE, 2012.*
Bringer et al., Privacy-Preserving Biometric Identification Using Secure Multiparty Computation, IEEE, 2013.*
Bringer et al., Privacy-Preserving Biometric Identification Using Secure Multiparty Computation, IEEE, 2013 (Year: 2013).*
Luo et al., An Efficient Protocol for Private Iris-Code Matching by Means of Garbled Circuits, IEEE, 2012 (Year: 2012).*
Li et al., Minutiae Matching with Privacy Protection Based on the Combination of Garbled Circuit and Homomorphic Encryption, Scientific World Journal, 2014 (Year: 2014).*
CN201780088726.7 , "Office Action", Jan. 9, 2023, 16 pages.
U.S. Appl. No. 16/478,041 , "Final Office Action", Feb. 15, 2022, 11 pages.
U.S. Appl. No. 16/478,041 , "Non-Final Office Action", Aug. 31, 2021, 10 pages.
U.S. Appl. No. 16/478,041 , "Notice of Allowance", Apr. 26, 2022, 11 pages.
Bringer et al., "Privacy-Preserving Biometric Identification Using Secure Multiparty Computation: An Overview and Recent Trends", IEEE Signal Processing Magazine, vol. 30, No. 2, Mar. 2013, pp. 42-52.
EP17901849.4 , "Extended European Search Report", Jan. 8, 2020, 8 pages.
EP17901849.4 , "Office Action", Nov. 22, 2021, 6 pages.
PCT/US2017/024099 , "International Preliminary Report on Patentability", Oct. 3, 2019, 11 pages.
PCT/US2017/024099 , "International Search Report and Written Opinion", Dec. 21, 2017, 14 pages.
241568453.8; European Extended Search Report; May 22, 2024; 12 pages.

* cited by examiner

AUTHENTICATION SYSTEM USING SECURE MULTI-PARTY COMPUTATION

CROSS-REFERENCES TO RELATED APPLICATIONS

This application is a continuation of U.S. application Ser. No. 16/478,041, filed on Jul. 15, 2019, which is a National Stage of International Application No. PCT/US2017/024099, filed Mar. 24, 2017, which are herein incorporated by reference in their entirety.

BACKGROUND

Existing authentication systems can utilize identification data input by a user, such as biometric data, to conduct authentication processes. For example, a user may register their biometric data with a resource provider in order to enable future authentications with the resource provider. The resource provider may store the user's registered biometric data, and compare it with biometric data received from the user during authentication. The use of biometric data can be convenient, since it may forgo the need for the user to remember and manage information (e.g., passwords, passcodes, PIN, etc.) in order to be authenticated. However, there are problems with such conventional authentication systems.

Conventional authentication systems do not provide sufficient security to protect a user's authentication data. For example, storing the authentication data at a server system can make sensitive information more likely to be compromised due to hacking by a malicious entity. Further, wireless transmission of the authentication data to devices associated other external parties can further exacerbate security issues. In some cases, this can expose the authentication data to untrustworthy parties and enable more chances for the identification data to be intercepted.

Embodiments of the invention address these and other problems, individually and collectively.

BRIEF SUMMARY

One embodiment of the invention is directed to a method performed by a first device. The method may comprise determining an obfuscated authentication function and sending information associated with the obfuscated authentication function to a second device. The method may further comprise receiving an obfuscated authentication result from the second device, wherein the obfuscated authentication result is determined by evaluating the obfuscated authentication function based on authentication information input by a user. In some cases, the authentication information may include biometric information. In some embodiments, the first device and the second device may communicate over a local network connection.

The method may further comprise determining whether the user is authenticated based on the obfuscated authentication result. In some cases, this may comprise determining one or more non-obfuscated values associated with the obfuscated authentication result, an authentication result based on the one or more non-obfuscated values, and whether the user is authenticated based on the authentication result. In some embodiments, the authentication result may indicate a degree to which the authentication information matches the enrollment information.

In some embodiments, the method may further comprise receiving a request from the second device to translate the authentication information into obfuscated authentication information and sending the obfuscated authentication information to the second device. In some implementations, sending the obfuscated authentication information comprises performing an oblivious transfer protocol between the first device and the second device.

In some embodiments, the obfuscated authentication function may be an obfuscated circuit. Generating the obfuscated circuit may comprise determining enrollment information input by the user and an authentication function that evaluates whether the user is authenticated based on the enrollment information and the authentication information. Generating the obfuscated circuit may further comprise determining a circuit representing the authentication function and obfuscating the circuit to determine the obfuscated circuit associated with the circuit. In some embodiments, the obfuscated circuit may be valid for a set number of uses.

One embodiment of the invention is directed to a method performed by a second device. The method may comprise receiving authentication information input by a user. The method may further comprise receiving information associated with an obfuscated authentication function from a first device. The method may further comprise evaluating the obfuscated authentication function based on the authentication information input by the user to determine an obfuscated authentication result. The method may further comprise sending the obfuscated authentication result to the first device, wherein the user is authenticated based on the obfuscated authentication result. In some embodiments, the obfuscated authentication function is an obfuscated circuit.

In some embodiments, evaluating the obfuscated authentication function may comprise a series a steps. The steps may include sending a request to the first device to translate the authentication information to obfuscated authentication information. The steps may further include receiving the obfuscated authentication information from the first device. In some implementations, receiving the obfuscated authentication information may comprise performing an oblivious transfer protocol between the first device and the second device. The steps may further include evaluating the obfuscated authentication function based on the obfuscated authentication information to determine the obfuscated authentication result.

Embodiments of the invention are also directed to a device comprising a processor and a computer readable medium coupled to the processor. The computer readable medium may comprise code executable to perform any of the methods described herein.

DETAILED DESCRIPTION

Figure 1:
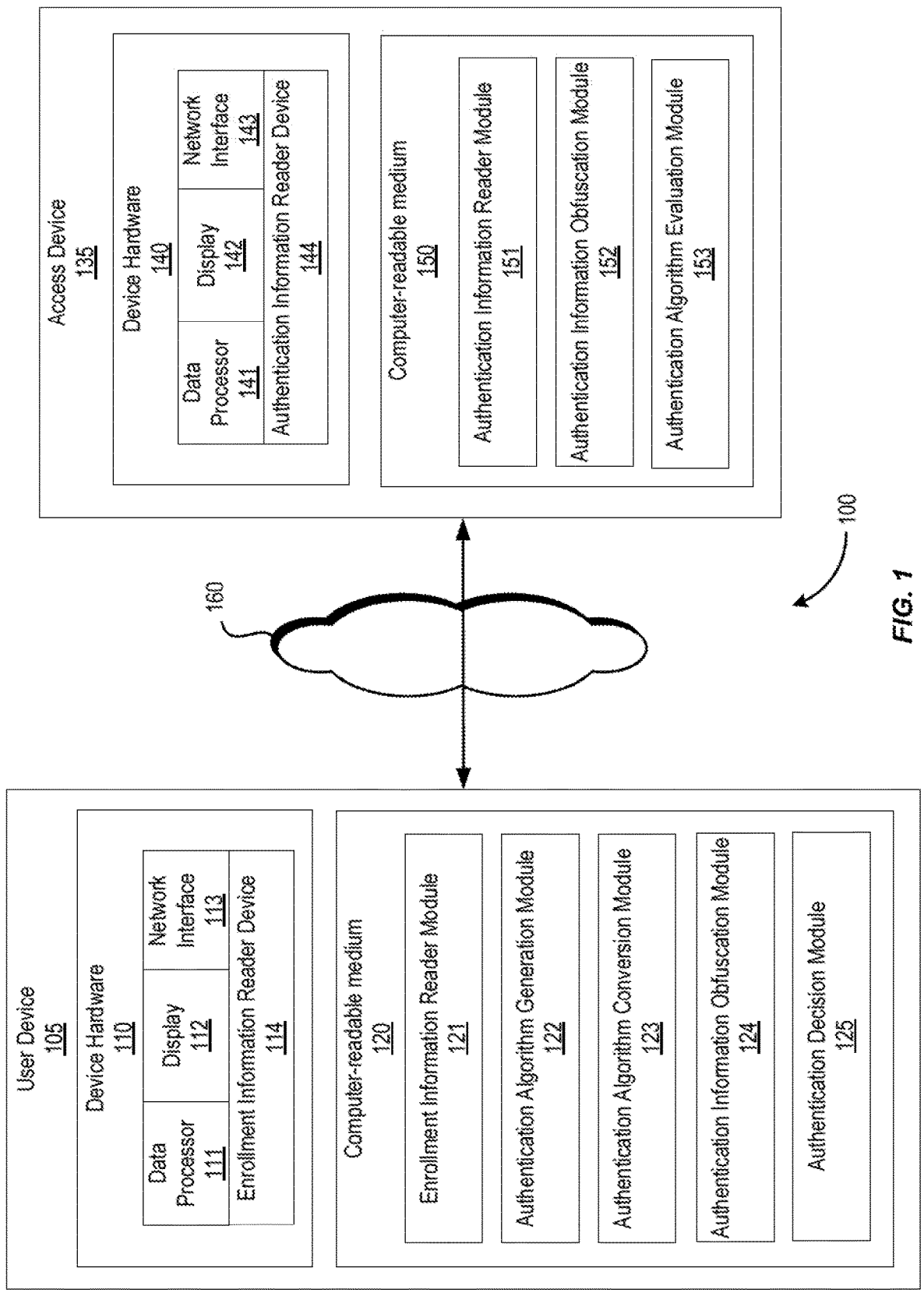
FIG. 1 shows an exemplary system according to some embodiments of the invention.

Embodiments of the invention are directed to a system that enables an authentication process that involves secure multi-party computation. Secure multi-party computation is a process that utilizes cryptographic techniques in order to enable multiple entities to jointly compute a function while keeping their inputs into the function private. Embodiments of the invention provide advantages over conventional authentication systems, which do not provide sufficient security to protect a user's sensitive authentication information. For example, storing authentication information at a remote system as in conventional authentication systems can make sensitive information more likely to be compromised due to hacking by a malicious entity. Further, wireless transmission of authentication information to devices associated other external parties as in conventional authentication systems can further exacerbate security issues. In contrast, embodiments of the invention enable a more secure authentication process.

Embodiments of the invention enable the authentication process that can be performed between a user device operated by a user and an access device and that may protect sensitive information. The user may enroll their enrollment information using their user device. At a later time, the user may initiate an authentication process by providing authentication information to the access device. In some embodiments, the enrollment information and the authentication information may be biometric data associated with the user. The user device and the access device may conduct the authentication process such that the enrollment information and authentication information input by the user is not transmitted between the devices, which reduces the risk that sensitive information can be intercepted be a malicious entity (e.g., intermediary entity, rogue access device, etc.). Instead, the user device may determine obfuscated values associated with the authentication information, so that the authentication information does not have to be transmitted between device. The user device may also determine an obfuscated authentication function that can be utilized to compare the enrollment information and authentication information without revealing the enrollment information and authentication information. Thus, the user can be authenticated without compromising security of their sensitive enrollment information or authentication information.

Before discussing specific embodiments of the invention, some descriptions of some terms may be useful.

A "non-obfuscated value" may be a piece of data that has not been manipulated in order to conceal its true value. For example, a non-obfuscated value may be an input of 0 or 1 into a logic circuit, or an output of 0 or 1 returned by a logic circuit.

An "obfuscated value" may be a piece of data that has been manipulated in order to conceal its true value. A non-obfuscated value corresponding to the obfuscated value may not be able to be determined based on the obfuscated value. In some cases, the obfuscated value may be a random value (e.g., random string, random key, etc.) that is mapped to a corresponding non-obfuscated value. In some cases, an obfuscated value may be a value that is generated by performing, on one or more values (obfuscated or non-obfuscated), a series of one or more operations that may comprise encryption, hashes, concatenation, bitwise operations (e.g., AND, OR, XOR, NOR, XNOR, NAND, etc.), and other computations. A "further obfuscated value" may be a value determined based on one or more obfuscated values. In some embodiments, the further obfuscated value may be determined using one or more of hash operations, bitwise operations, concatenation operations, or other operations.

"Authentication information" may be information that can be utilized to authenticate a user. In some cases, authentication information may be utilized to verify the identity of the user. In some embodiments, the user may input the authentication information into a device during an authentication process. Examples of authentication information include biometric data (e.g., fingerprint data, digital photographic data (e.g., facial recognition data), 3-D body structure data (e.g., 3-D facial structure recognition data), deoxyribonucleic acid (DNA) data, palm print data, hand geometry data, retinal recognition data, iris recognition data, voice recognition data, etc.), passwords, passcodes, and other secret information (e.g., security question answers).

"Enrollment information" may be information that can be utilized to enroll a user. In some embodiments, the user may input the enrollment information into a device during an enrollment process. Examples of enrollment information may include identification information (e.g., name, email, phone number, address, etc.), as well as authentication information associated with the user.

An "authentication function" may be a function that can be utilized to determine whether a user is authenticated. In some embodiments, the authentication function may be utilized to evaluate whether the user is authenticated based on enrollment information input by the user during an enrollment process and authentication information to be input by the user during an authentication process. In some embodiments, the authentication function may be designed so that it takes both the enrollment information and the authentication information as inputs. In other embodiments, the authentication function may be designed so that the enrollment information is hardcoded into the authentication function, and thus it takes just the authentication information as an input. The authentication function may output an authentication result that can be utilized to determine whether the user is authenticated.

A "circuit representing the authentication function" may be any suitable circuit representation of the authentication function. In some embodiments, the circuit representing the authentication function may be a logic circuit that implements the authentication function. The logic circuit may comprise one or more logic gates, where each of the logic gates may be able to take in any suitable number of inputs (e.g., by two or more input wires). The logic circuit may also return any suitable number of outputs based on which the authentication result can be determined.

An "obfuscated circuit" may be a circuit for which its inputs and outputs are obfuscated. For example, if the circuit is a logic circuit comprising one or more logic gates, each of the input and output wires of the one or more logic gates may be assigned a different obfuscated value. The true value (e.g., 0/1) of a wire may not be able to be determined based on an obfuscated value assigned to the wire. The obfuscated value may be a random value, such as a random string or a random key (e.g., 128-bit AES key).

An "obfuscated authentication function" may be an authentication function for which its inputs and outputs are obfuscated. In some embodiments, the obfuscated authentication function may be an obfuscated circuit. The obfuscated circuit may be generated by first determining a circuit representing the authentication function and then obfuscating the circuit. In some embodiments, there may be certain information associated with the obfuscated authentication function. For example, the information may indicate how logic gates are connected to each other in the obfuscated circuit, and can include values generated based on obfuscated values corresponding to the wires of each of the logic gates.

An "authentication result" may be a value that can indicate whether a user is authenticated. In some embodiments, the authentication result may indicate a degree to which authentication information associated with the user matches enrollment information associated with the user. Examples of the authentication result include a Boolean value (e.g., "True"/"False", 1/0, "Yes"/"No", etc.) or a value within a range (e.g., 0-99%, 1-10, etc.).

An "obfuscated authentication result" may comprise one or more obfuscated values that can be utilized to determine the authentication result. In some embodiments, the obfuscated authentication result may comprise an obfuscated value that is mapped to a non-obfuscated value indicating the authentication result. For example, the obfuscated value may be a random string that is mapped to a Boolean value (e.g., "True"/"False", 1/0, "Yes"/"No", etc.) indicating the authentication result. In other embodiments, the obfuscated authentication result may comprise a plurality of obfuscated values that each be mapped to a non-obfuscated value. The plurality of non-obfuscated values can then be combined to determine the authentication result. For example, each of the plurality of obfuscated values may be a random string that is mapped to a bit (e.g., 0 or 1). The authentication result may a value within a range (e.g., 0-99%, 1-10, etc.) that can be determined by concatenating the mapped bits.

A "resource providing entity" can be any entity that provides resources. In some embodiments, the resource providing entity may provide resources to a user during a transaction. Examples of a resource providing entity can include a merchant, a venue operator, a building owner, a governmental entity, etc. A resource providing entity may also be known as a resource provider.

A "computing device" may be any suitable electronic device that can process and communicate information to other electronic devices. The computing device may include a processor and a computer readable medium coupled to the processor, the computer readable medium comprising code, executable by the processor. The computing device may also include input devices and output devices that are operatively coupled to the processor, as well as an external communication interface for communicating with other computing devices or other entities. For example, the computing device can provide remote communication capabilities to a network. Examples of these remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network.

Some exemplary types of computing device may include a mobile device, a cardholder device, a user device, a consumer device, a server computing device, an appliance, and any computer. Some non-limiting examples of mobile devices include mobile phones (e.g., cellular phones), keychain devices, personal digital assistants (PDAs), pagers, notebooks, laptops, notepads, net books, tablet computers, wearable devices (e.g., smart watches, fitness bands, jewelry, etc.), automobiles or motorcycles with remote communication capabilities, person music player devices, personal computers, hand-held specialized readers, and the like.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

Messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

FIG. 1 shows an exemplary system 100 according to some embodiments of the invention. FIG. 1 shows a user device 105 in communication with an access device 135 over a communications network 160. User device 105 and access device 135 may perform an authentication process using secure multi-party computation according to embodiments of the invention. While various components included in FIG. 1 are shown to be separate components, embodiments are not so limited. For example, some of the components can be combined. Additionally, any of the components shown can be split into sub-systems.

Communications network 160 may be any suitable network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, Bluetooth, and/or the like); and/or the like.

User device 105 may be a computing device operated by a user. In some cases, user device 105 may be a mobile device that the user can carry in proximity to access device 135. In other cases, user device 105 may be a mobile device or other computing device that the user may operate to remotely communicate with access device 135. User device 105 may comprise device hardware 110 including data processor 111, a display 112, a network interface 113, and an enrollment information reader device 114. User device 105 may also include a computer-readable medium 120.

Data processor 111 may include hardware that carries out instructions embodied as code in computer-readable medium 120. In some cases, data processor 111 may be a central processing unit (CPU). Data processor 111 may include a single-core processor, a plurality of single-core processors, a multi-core processor, a plurality of multi-core processors, or any other suitable combination of hardware configured to perform arithmetical, logical, and/or input/output operations of user device 105.

Display 112 may include hardware that can show information to a user. In some cases, display 112 may be any suitable screen that enables touch functionality. In some embodiments, display 112 may show a user interface that can allow the user to select and interact with objects presented on display 112 with their finger or suitable touch screen stylus pen. The objects may include, but may not be limited to, menus, text fields, icons, and keys/inputs on a virtual keyboard. In some embodiments, display 112 may show an output from a data capture device. Display 112 may also be capable of displaying colors.

Network interface 113 may be any suitable combination of hardware and software that enables data to be transferred to and from user device 105. Network interface 113 may enable user device 105 to communicate data to and from another device, such as access device 135. Some examples of network interface 113 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 113 may include Wi-Fi™.

Data transferred via network interface 113 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 113 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Enrollment information reader device 114 may be any suitable device that can read enrollment information input by a user. The enrollment information may be input during an enrollment process to enroll the user. In some embodiments, enrollment information reader device 114 can include any suitable combination of scanners, readers, cameras, microphones, speakers, detectors, or other devices. In some cases, enrollment information reader device 114 may be a biometric reader device that is capable of reading biometric data (e.g., fingerprint data, digital photographic data (e.g., facial recognition data), 3-D body structure data (e.g., 3-D facial structure recognition data), deoxyribonucleic acid (DNA) data, palm print data, hand geometry data, retinal recognition data, iris recognition data, voice recognition data, etc.) input by a user.

Computer-readable medium 120 may comprise a plurality of modules. The modules may include an enrollment information reader module 121, an authentication algorithm generation module 122, an authentication algorithm conversion module 123, an authentication information obfuscation module 124, and an authentication decision module 125. While not explicitly shown in FIG. 1, other modules and submodules may also reside on the computer-readable medium 120. Examples of additional modules may include modules for processing and routing messages, data extraction (e.g., for retrieving data from external data sources) modules, storage modules, and message modification modules. Each module in user device 105 may be combined with any of the additional modules as appropriate. Each module in user device 105 may comprise one or submodules, where each submodule may comprise one or more functions implemented by code, executable by data processor 111. Any number of the modules in computer-readable medium 120 may be part of a mobile application (e.g., authentication application, transaction application, etc.) stored on user device 105.

Enrollment information reader module 121 may process, in conjunction with data processor 111, enrollment information (e.g., biometric data). For example, enrollment information reader module 121 can receive, in conjunction with data processor 111, enrollment information from enrollment information reader device 114 and may generate, in conjunction with data processor 111, a digital reference that can store the enrollment information. In some cases, the digital reference may be known as an enrollment template. The enrollment template may store the enrollment information in any suitable format, such as by any suitable combination of numbers, strings, matrices, coordinates, and other data that can uniquely represent the enrollment information. In some embodiments, enrollment information reader module 121 may send, in conjunction with data processor 111, the enrollment template to authentication algorithm generation module 122 and/or authentication algorithm conversion module 123.

Authentication algorithm generation module 122 may generate, with data processor 111, an authentication function. The authentication function may be utilized to evaluate whether the user is authenticated based on the enrollment information input during the enrollment process and authentication information to be input during the authentication process. For example, the authentication function may be configured to compare two templates, one determined based on enrollment information and one determined based on authentication information, and output an authentication result based on the comparison. Authentication algorithm generation module 122 may send, in conjunction with data processor 111, the generated authentication function and any other relevant information (e.g., the enrollment template) to authentication algorithm conversion module 123.

Authentication algorithm conversion module 123 may convert with data processor 111, the authentication function into another format. In some cases, authentication algorithm conversion module 123 may determine, with data processor 111, a circuit based the authentication function. The circuit may include a plurality of logic gates and may output an authentication result that matches that of the authentication function. In some embodiments, prior to generation of the circuit, the authentication algorithm conversion module 123 may transform, with data processor 111, the authentication function from a function that takes two variables as inputs into a function that takes one variable as an input. This conversion can be performed because the authentication algorithm conversion module 123 may already know the enrollment template after previously receiving it from enrollment information reader module 121 or authentication algorithm generation module 122. Authentication algorithm conversion module 123 may incorporate (e.g., substitute or hard-code), with data processor 111, the known enrollment template into the authentication function, so that there is only one unknown variable, the authentication template. The authentication algorithm conversion module 123 may determine, with data processor 111, a circuit based on the authentication function with one unknown variable.

Authentication algorithm conversion module 123 may further determine, in conjunction with data processor 111, an obfuscated authentication function. In some embodiments, the obfuscated authentication function may be an obfuscated circuit based on obfuscating the circuit determined based on the authentication function. Authentication algorithm conversion module 123 may obfuscate, with data processor 111, the circuit by assigning obfuscated values (e.g., random values) to each input and output value of the wires in logic gates making up the circuit. For example, if a wire of a logic gate has potential non-obfuscated values of 0 or 1, authentication algorithm conversion module 123 may assign, with data processor 111, a first obfuscated value to correspond with the value of 0 and a second obfuscated value to correspond with the value of 1.

Communications about the obfuscated circuit between user device 105 and access device 135 may be conducted utilizing the assigned obfuscated values instead of the non-obfuscated values. For example, authentication algorithm conversion module 123 may send, in conjunction with data processor 111, information associated with the obfuscated circuit to the access device. In some embodiments, this information may include obfuscated values associated with each logic gate in the obfuscated circuit, as well as information indicating how the logic gates are connected together.

Authentication information obfuscation module 124 may determine, in conjunction with data processor 111, obfuscated authentication information based on the authentication information associated with the user. Authentication information obfuscation module 124 may conduct, with data processor 111, an oblivious transfer protocol process with authentication information obfuscation module 152 of access device 135. In some embodiments, user device 105 may function as the server for the oblivious transfer protocol. For example, authentication information obfuscation module 124 may receive, in conjunction with data processor 111, a request for obfuscated authentication information from authentication information obfuscation module 152. Authentication information obfuscation module 124 may send, in conjunction with data processor 111, obfuscated values corresponding to the authentication information associated with the user to authentication information obfuscation module 152. In some embodiments, the obfuscated authentication information may be sent over a plurality of messages between user device 105 and access device 135. A more detailed description of an exemplary oblivious transfer protocol is described with respect to FIG. 6.

Authentication decision module 125 may determine, in conjunction with data processor 111, determine whether the user can be authenticated. Authentication decision module 125 may receive, in conjunction with data processor 111, an obfuscated authentication result from access device 135 and may determine, with data processor 111, an authentication result based on the obfuscated authentication result. For example, in some embodiments, authentication decision module 125 may determine, with data processor 111, one or more non-obfuscated values associated with the obfuscated authentication result and then determine, with data processor 111, an authentication result based on the one or more non-obfuscated values. Authentication decision module 125 may determine, with data processor 111, whether the user is authenticated based on the authentication result.

Access device 135 may be any suitable computing device that can be utilized to access a system. For example, access device 135 can provide access to (e.g., enable communication with) a server computer, resource provider computer, a processor computer, a user computer apparatus, a mobile device, or other computing device. Access device 135 may generally be located in any suitable location, such as at the location of a resource provider.

Access device 135 may be in any suitable form. Some examples of access device 135 include POS devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. Access device 135 may utilize any suitable contact or contactless mode of operation to send or receive data from, or associated with, another computing device. In some embodiments, where access device 135 may comprise a POS terminal, any suitable POS terminal may be utilized and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

Some of the components of access device 135 are shown in FIG. 1. Access device 135 may comprise device hardware 140 including data processor 141, a display 142, a network interface 143, and an authentication information reader device 155. Data processor 141, display 142, and network interface 143 may include similar characteristics to those described for data processor 111, display 112, and network interface 113, respectively. Access device 135 may also include a computer-readable medium 150.

Authentication information reader device 144 may be any suitable device that can read authentication information input by a user. The authentication information may be input during an authentication process to authenticate the user. In some embodiments, authentication information reader device 144 can include any suitable combination of scanners, readers, cameras, microphones, speakers, detectors, or other devices. In some cases, authentication information reader device 144 may be a biometric reader device that is capable of reading biometric data (e.g., fingerprint data, digital photographic data (e.g., facial recognition data), 3-D body structure data (e.g., 3-D facial structure recognition data), deoxyribonucleic acid (DNA) data, palm print data, hand geometry data, retinal recognition data, iris recognition data, voice recognition data, etc.) input by a user.

Computer-readable medium 150 may comprise a plurality of modules. The modules may include an authentication information reader module 151, an authentication information obfuscation module 152, and an authentication algorithm evaluation module 153. While not explicitly shown in FIG. 1, other modules and submodules may also reside on the computer-readable medium 150. Examples of additional modules may include modules for processing and routing messages, data extraction (e.g., for retrieving data from external data sources) modules, storage modules, and message modification modules. Each module in access device 135 may be combined with any of the additional modules as appropriate. Each module in access device 135 may comprise one or submodules, where each submodule may comprise one or more functions implemented by code, executable by data processor 141. Any number of the modules in computer-readable medium 150 may be part of a mobile application (e.g., authentication application, transaction application, etc.) stored on access device 135.

Authentication information reader module 151 may process, in conjunction with data processor 141, authentication information (e.g., biometric data). For example, authentication information reader module 151 can receive, in conjunction with data processor 141, authentication information from authentication information reader device 144 and may generate, in conjunction with data processor 141, a digital reference that can store the authentication information. In some cases, the digital reference may be known as an authentication template. The authentication template may store the authentication information in any suitable format, such as by any suitable combination of numbers, strings, matrices, coordinates, and other data that can uniquely represent the authentication information. In some embodiments, authentication information reader module 151 may send, in conjunction with data processor 141, the authentication template to authentication information obfuscation module 152.

Authentication information obfuscation module 152 may determine, in conjunction with data processor 141, obfuscated authentication information based on the authentication information associated with the user. Authentication information obfuscation module 152 may conduct, with data processor 141, an oblivious transfer protocol process with authentication information obfuscation module 124 of user device 105. In some embodiments, access device 135 may function as the client for the oblivious transfer protocol. For example, authentication information obfuscation module 152 may request, in conjunction with data processor 141, obfuscated authentication information from authentication information obfuscation module 124. Authentication information obfuscation module 152 may receive, in conjunction with data processor 111, obfuscated values corresponding to the authentication information associated with the user from authentication information obfuscation module 124. In some embodiments, the obfuscated authentication information may be received over a plurality of messages between user device 105 and access device 135. A more detailed description of an exemplary oblivious transfer protocol is described with respect to FIG. 6.

Authentication algorithm evaluation module 153 may evaluate, in conjunction with data processor 141, the obfuscated authentication function for an obfuscated authentication result. In some embodiments, the evaluation may be performed based on the obfuscated authentication information determined by authentication information obfuscation module 152. In some embodiments, the obfuscated authentication function may be an obfuscated circuit. Based on evaluating the obfuscated circuit, authentication algorithm evaluation module 153 may determine, with data processor 141, the obfuscated authentication result comprising one or more obfuscated value. Authentication algorithm evaluation module 153 may send, in conjunction with data processor 141, the obfuscated authentication result to user device 105, which can determine whether the user is authenticated based on the obfuscated authentication result.

While not explicitly shown in FIG. 1, user device 105 and access device 135 may be in communication with other computing devices. In some embodiments, access device 135 may be in communication with one or more server computers that enable processing of a transaction conducted between user device 105 and access device 135. For example, access device 135 may be in communication with a resource provider computer so that the user that is operating user device 105 can receive access to a resource (e.g., purchase to a product, access to the inside of a building, etc.) from the resource provider computer upon being authenticated.

Figure 2:
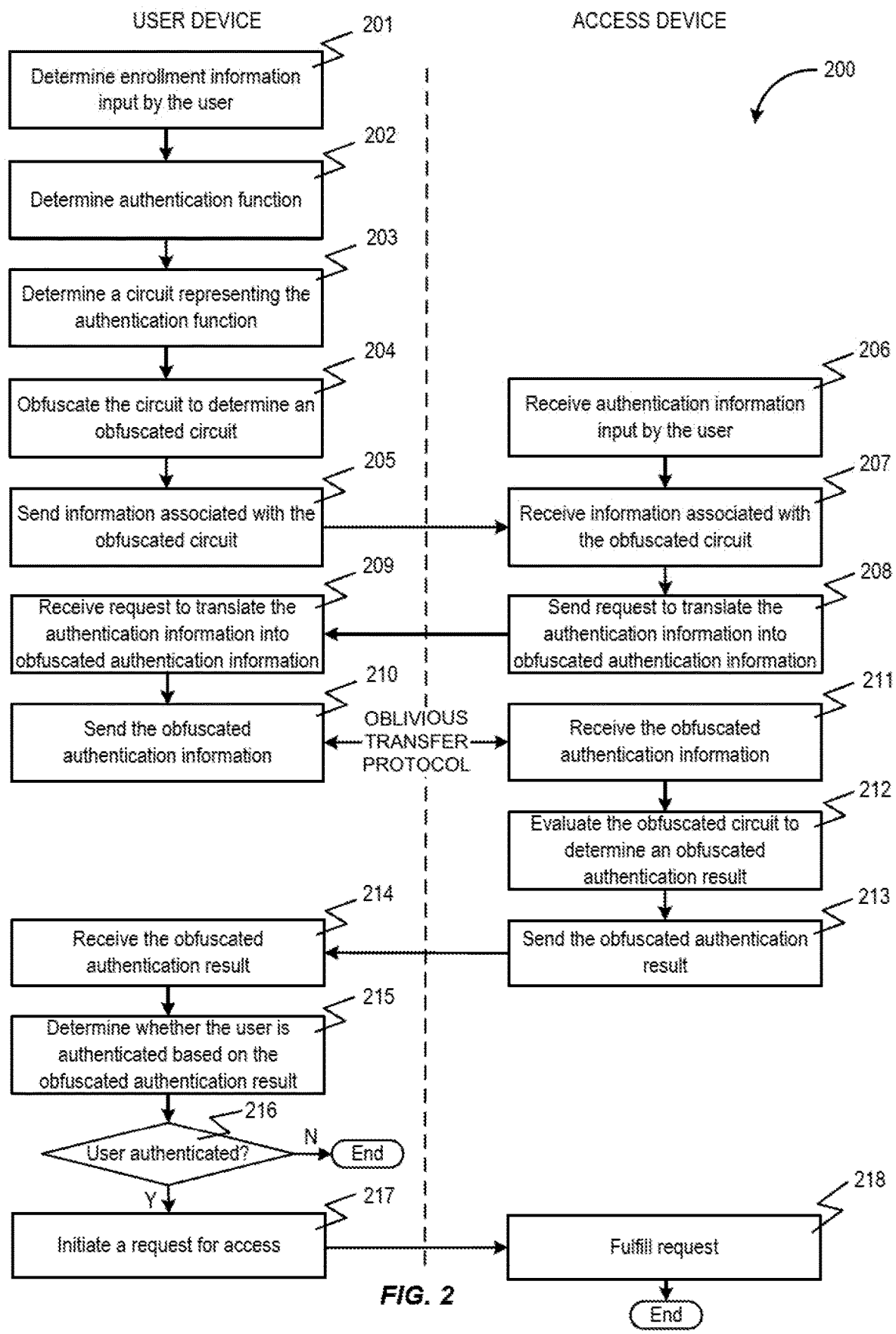
FIG. 2 shows an exemplary flow for an authentication process according to some embodiments of the invention.

FIG. 2 shows an exemplary flow 200 for an authentication process according to some embodiments of the invention. The authentication process may be conducted between a user device (e.g., user device 105) and an access device (e.g., access device 135) to authenticate the user operating the user device. In some embodiments, the authentication process can be conducted so that the user can receive access to a resource.

It is understood that flow 200 shown in FIG. 2 is not meant to be limiting.

For example, the numbering of the steps shown for flow 200 does not necessarily indicate the order in which the steps are to be performed. In some cases, some steps may be performed in a different order than that shown or may be performed in parallel with other steps. Further, it is understood that additional methods and processes may be included within these methods and may be recognized by one of ordinary skill in the art, in light of the description herein. In some embodiments of the present invention, the described methods may be combined, mixed, and matched, as one of ordinary skill would recognize.

At step 201, the user device may determine enrollment information input by the user. In some embodiments, if the user already enrolled and thus previously provided enrollment information, the user device may perform step 201 by retrieving the enrollment information input by the user stored in its systems or other trusted system. In other embodiments, the user may input enrollment information into an enrollment information reader device of the user device to conduct an enrollment process. In some embodiments, the enrollment information may include biometric information and the enrollment information reader device may be a biometric reader.

In one exemplary case, the user may place their finger on the enrollment information reader device, which may read fingerprint data associated with the user's finger. The user device may then generate a digital reference associated with the fingerprint data. In some cases, the digital reference may be known as an enrollment template. The enrollment template may store the fingerprint data determined during the enrollment process in any suitable format, such as by any suitable combination of numbers, strings, matrices, coordinates, and other data that can uniquely represent the fingerprint data.

At step 202, the user device may determine an authentication function. The authentication function may be any suitable function that can evaluate whether the user is authenticated based on the enrollment information input during the enrollment process and authentication information to be input during the authentication process. For example, the authentication function may implement a matching algorithm that can be configured to compare two templates, one determined based on the enrollment information and one determined based on the authentication information, and output an authentication result based on the comparison.

In some implementations, the authentication function can be written in a high-level programming language. The authentication function may utilize any suitable combination of data types (e.g., integer, Boolean, enum, etc.) and data structures (e.g., array, list, etc.). Further, the authentication function may utilize any suitable operators (e.g., addition, subtraction, bitwise operators, comparison operators, etc.), loops (e.g., for-loops, etc.), and conditional execution (e.g., if-then statements, if-then-else statements, etc.).

Figure 3:
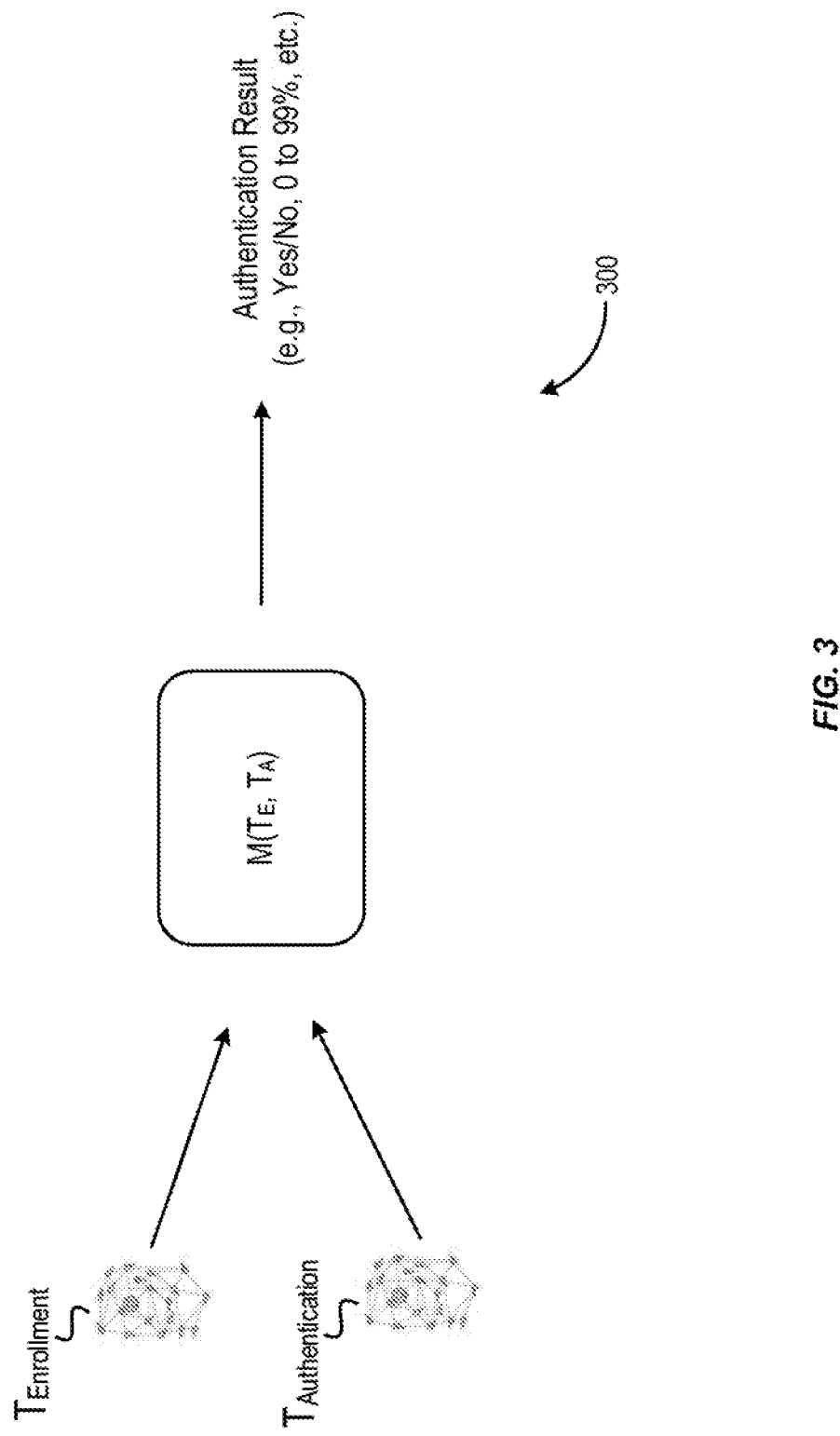
FIG. 3 shows an exemplary authentication function according to some embodiments of the invention.

FIG. 3 shows an exemplary authentication function 300 according to some embodiments of the invention. The authentication function 300 is represented as a function M that takes two templates as inputs. One template can be represented as $T_{Enrollment}$ or $T_E$, and may be an enrollment template that can be determined based on the enrollment information associated with the user. Another template can be represented as $T_{Authentication}$ or $T_A$, and may be an authentication template that can be determined based on authentication information to be input by the user during an authentication process. In some embodiments, authentication function 300 may be configured so that it can compare the enrollment template $T_E$ to the authentication template $T_A$ and output an authentication result based on the comparison.

Authentication function 300 may be configured to compare the enrollment template $T_E$ and the authentication template $T_A$ in any suitable manner. For example, the enrollment template $T_E$ and the authentication template $T_A$ may each be associated with one or more values determined from fingerprint data collected during enrollment and authentication processes, respectively. The one or more values may include any suitable combination of numbers, strings, matrices, coordinates, and other data that can uniquely represent the collected fingerprint data.

Some exemplary comparison processes are described. In an exemplary case, enrollment template $T_E$ may comprise a matrix representation of the fingerprint data collected during enrollment and the authentication template $T_A$ may comprise a matrix representation of the fingerprint data collected during authentication. In some cases, a matrix representation may indicate the pixel values (e.g., in grayscale) of a fingerprint image. Authentication function 300 may be configured to perform comparisons for each corresponding bit in the matrices to determine how well the fingerprint data collected during enrollment and the fingerprint data collected during authentication match. In another exemplary case, enrollment template $T_E$ may comprise a vector representation of the fingerprint data collected during enrollment and the authentication template $T_A$ may comprise a vector representation of the fingerprint data collected during authentication. In some cases, a vector representation may indicate the position and direction of certain characteristic geometric shapes, typically called "minutiae", such as ridge endings and ridge bifurcations that can be derived from a fingerprint scan. Authentication function 300 may be configured to perform comparisons for each corresponding vector to determine how well the fingerprint data collected during enrollment and the fingerprint data collected during authentication match.

In some embodiments, authentication function 300 may be configured so that it outputs an authentication result that can indicate a degree to which the enrollment information and the authentication information match with each other. For example, in some cases, the authentication result may include a Boolean value (e.g., 0/1, "Yes"/"No", "True"/"False", etc.) that indicates whether the enrollment template and the authentication template match. In other cases, the authentication result may include a value within a range (e.g., 0-100, 1-10, etc.) that indicates how well the enrollment template and the authentication template match. For example, if it is determined that 97% of authentication template $T_A$ matches with enrollment template $T_E$, authentication function 300 may output an authentication result including the value "97" to indicate a degree to which the two templates match.

Referring back to FIG. 2, at step 203, the user device may determine a circuit representing the authentication function determined in step 202. In some embodiments, prior to generation of the circuit, the user device may transform the authentication function from a function that takes two variables as inputs into a function that takes one variable as an input. Step 203 is described in more detail with respect to FIG. 4 below.

Figure 4:
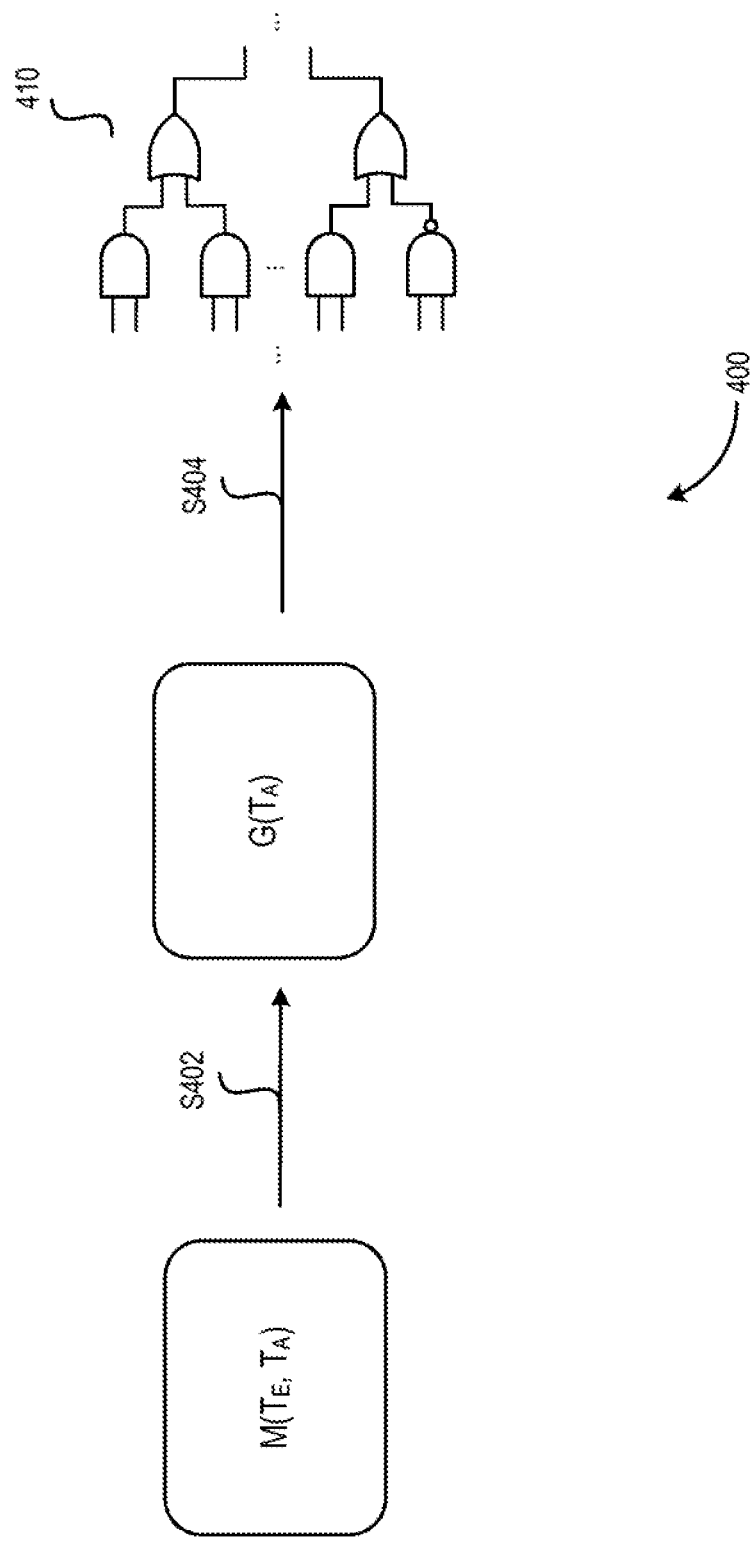
FIG. 4 shows an exemplary flow for converting an authentication function according to some embodiments of the invention.

FIG. 4 shows an exemplary flow 400 for converting an authentication function according to some embodiments of the invention. The function M shown in FIG. 4 may correspond to function M shown in FIG. 3, where M takes two templates, $T_E$ and $T_A$, as inputs. $T_E$ may be the enrollment template determined based on enrollment information associated with the user and $T_A$ may be the authentication template to be determined based on authentication information associated with the user.

At step S402, the user device may transform the authentication function from the function M that takes two variables, enrollment template $T_E$ and authentication template $T_A$, as inputs, into a function G that takes one variable, authentication template $T_A$, as its input. This conversion can be performed because the user device may already know the enrollment template associated with the user after previously receiving it during the enrollment process. The user device may incorporate (e.g., substitute, hard-code, etc.) the known enrollment template as the value for $T_E$ into function M, so that there is only one unknown variable $T_A$. For example, the user device may revise the authentication function to initialize a variable corresponding to the $T_E$ value with the value of the known enrollment template. Hence, the authentication functions M and G may be equivalent functions such that $G(T_A)=M(T_E, T_A)$ and can output the same authentication result. It is noted that if the value of $T_E$ changes based on the user enrolling with new enrollment information, the function G may be regenerated by incorporating a new enrollment template determined based on the new enrollment information as the value for $T_E$ into function M.

At step S404, the user device may determine a circuit 410 representing the function G. In some embodiments, circuit 410 may be a logic circuit including a plurality of connected logic gates (e.g., AND, OR, XOR, NOR, XNOR, NAND, etc.). Circuit 410 may implement function G such that for any input x, the outcome of evaluating circuit 410 with the input x can be utilized to determine $G_{(x)}$. In some cases, circuit 410 may be configured so that evaluating circuit 410 with input x may output a result equivalent to $G_{(x)}$. In other cases, circuit 410 may be configured so that evaluating circuit 410 with input x may output a result that can be processed (e.g., concatenate bits, etc.) to determine $G_{(x)}$. It is noted that circuit 410 shown in FIG. 4 simply shows an exemplary circuit and is not meant to be limiting, since circuit 410 can comprise any suitable configuration of logic gates.

The user device may transform the function G into circuit 410 in any suitable manner. For example, the user device may parse the function G and perform inline expansion on function calls within function G, as well as may perform loop unrolling on loops within function G. The user device may further convert any commands that handle multi-bit values into a series of single-bit operations. The series of single-bit operations may then be converted into a sequence of circuit components. After the circuit components are combined together, the user device may possess circuit 410 representing function G. In some embodiments, the user device may further optimize circuit 410 (e.g., reduce its size), so that evaluation of circuit 410 can be performed more efficiently. Any suitable techniques for optimizing circuit 410 can be utilized. In some embodiments, a compiler may perform the transformation of the function G into circuit 410, where the compiler is capable of receiving a function written in a high-level programming language and converting it into a low-level logic circuit (e.g., Boolean circuit).

Referring back to FIG. 2, at step 204, the user device may obfuscate the circuit determined in step 203 to determine an obfuscated circuit. In some embodiments, the user device may obfuscate the circuit by assigning one or more random values to each of the wires in the circuit. For example, if a wire in the circuit can be either of two possible values, 0 or 1, obfuscating the circuit may comprise assigning two random values to the wire, one of the random values corresponding to the non-obfuscated value 0 and the other random value corresponding to the non-obfuscated value 1. The random values may be generated in such a way that the non-obfuscated values of the wire cannot be derived from the corresponding random values. Step 204 is described in more detail with respect to FIG. 5 below.

Figure 5:
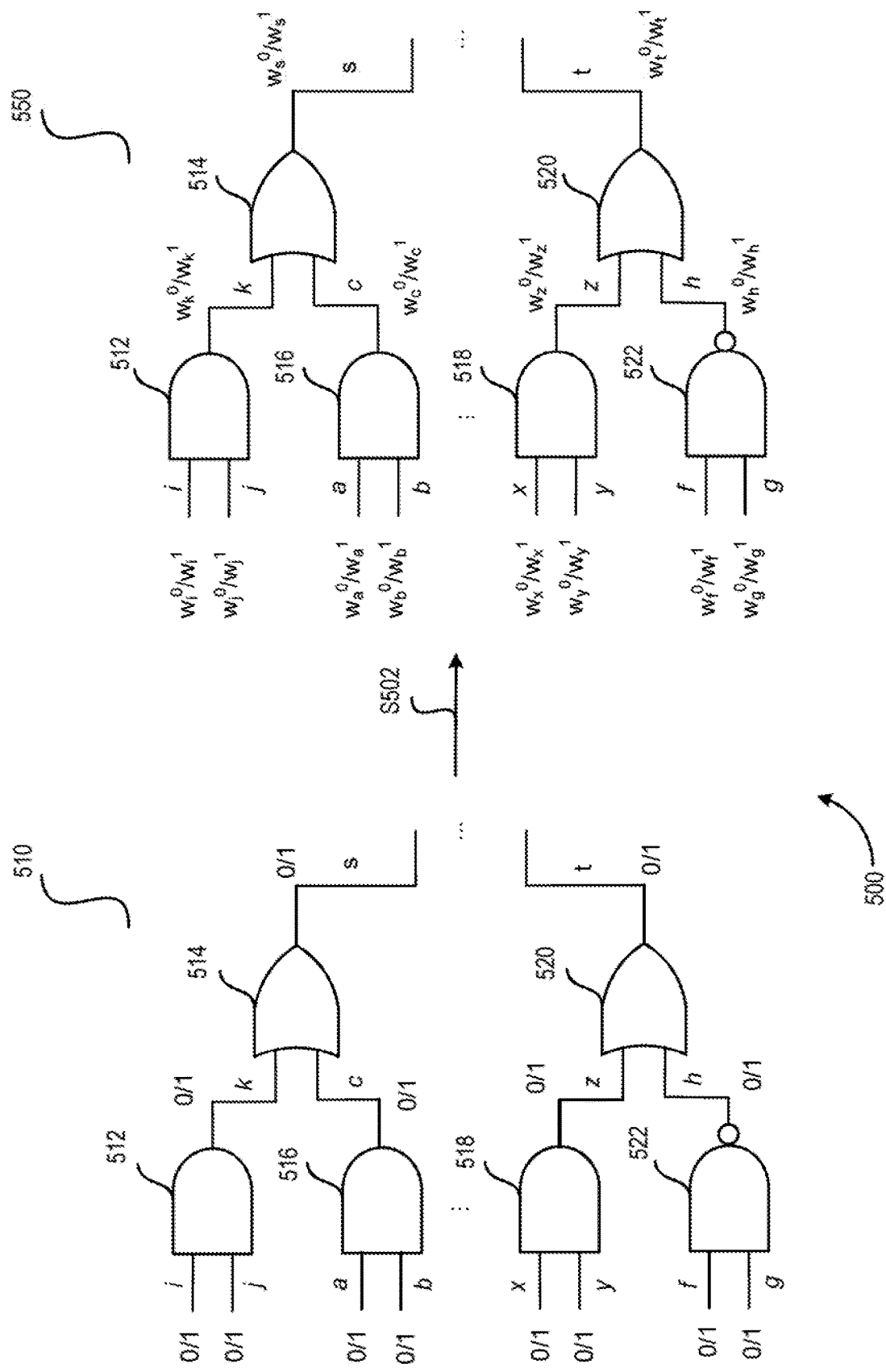
FIG. 5 shows an exemplary flow for determining an obfuscated function according to some embodiments of the invention.

FIG. 5 shows an exemplary flow 500 for determining an obfuscated function according to some embodiments of the invention. In some embodiments, flow 500 may be performed by the user device. Flow 500 shows a circuit 510 and an obfuscated circuit 550, which may be the result of obfuscating circuit 510. It is understood that circuit 510 and obfuscated circuit 550 shown in FIG. 5 are not meant to be limiting and simply are utilized to demonstrate how a circuit can be obfuscated according to embodiments of the invention. Circuit 510 and obfuscated circuit 550 can comprise any suitable configuration of logic gates other than those shown in FIG. 5. In some implementations, some logic gates in circuit 510 or obfuscated circuit 550 may include more than two input wires.

Circuit 510 and obfuscated circuit 550 shown in FIG. 5 comprise a plurality of logic gates 512 through 522, where each logic gate includes two input wires and one output wire. For example, logic gate 512 includes two input wires i and j, as well as one output wire k. In circuit 510, each of the wires i, j, and k may take the values 0 or 1, indicated by "0/1" in FIG. 5. In obfuscated circuit 550, wires i, j, and k may each take two obfuscated values corresponding to values 0 and 1, which is described in further detail below.

At step S502, the user device may obfuscate circuit 510 to determine obfuscated circuit 550. Obfuscating circuit 510 may comprise determining (e.g., generating) two obfuscated values for each wire in circuit 510 and assigning the obfuscated values to corresponding wires in obfuscated circuit 550. For example, the user device may determine obfuscated values $w_i^0$ or $w_i^1$ for wire i in circuit 510. Accordingly, wire i in obfuscated circuit 550 may be assigned obfuscated values $w_i^0$ or $w_i^1$, where the obfuscated values correspond to values 0 and 1, respectively. Similarly, wire j in obfuscated circuit 550 may be assigned obfuscated values $w_j^0$ or $w_j^1$ and wire k may be assigned obfuscated values $w_k^0$ or $w_k^1$, where $w_j^0$ and $w_k^0$ correspond to value 0 and $w_j^1$ and $w_k^1$ correspond to value 1. A similar obfuscating process may be performed for the wires of logic gates 514 through 522. The user device may store the association between the non-obfuscated values of the wires and their corresponding obfuscated values. In some embodiments, the obfuscated values may be random values such that they cannot be utilized to derive the non-obfuscated value, 0 or 1, of the logic gate wires. In some implementations, the obfuscated values may be random cryptographic keys (e.g., 128-bit AES keys).

The assignment of obfuscated values to wires is described below with respect to exemplary truth tables. The truth table corresponding to logic gate 512, an AND gate, in circuit 510 is shown in Table 1 below. Table 1 shows the non-obfuscated values of the wires in logic gate 512, where the output wire k has a value of 1 only if both input wires i and j also have values of 1. The truth table corresponding to logic gate 512 in obfuscated circuit 550 is shown in Table 2 below. Table 2 shows the obfuscated values corresponding to the non-obfuscated values of wires i, j, and k shown in Table 1. The user device may store the mappings between the obfuscated values included in Table 2 and the non-obfuscated values of the wires included in Table 1.

TABLE 1

| wire i | wire j | wire k |
|--------|--------|--------|
| 0 | 0 | 0 |
| 0 | 1 | 0 |
| 1 | 0 | 0 |
| 1 | 1 | 1 |

TABLE 2

| wire i | wire j | wire k |
|--------|--------|--------|
| $w_i^0$ | $w_j^0$ | $w_k^0$ |
| $w_i^0$ | $w_j^1$ | $w_k^0$ |
| $w_i^1$ | $w_j^0$ | $w_k^0$ |
| $w_i^1$ | $w_j^1$ | $w_k^1$ |

In some embodiments, the obfuscated circuit determined in step 204 may be limited for a set number of uses. In some cases, the obfuscated circuit may be a one-time circuit. Thus, each time that an authentication process is performed for the user, the user device may generate a new obfuscated circuit to be utilized for authentication of the user. In another exemplary case, the obfuscated circuit may be limited to use for five times. The user device may track the number of times that the obfuscated circuit has been utilized for authentication of the user, and may generate a new obfuscated circuit after five uses have been counted. The regeneration of the obfuscated circuit can increase security, since this reduces the chance that any information related to the obfuscated circuit determined can be successfully utilized for fraudulent purposes.

Referring back to FIG. 2, at step 205, the user device may send information associated with the obfuscated circuit to the access device. In some embodiments, the information may include further obfuscated values associated with each logic gate in the obfuscated circuit, as well as information indicating how the logic gates in the obfuscated circuit are connected to each other. In some implementations, the information may include four further obfuscated values associated with each logic gate, where each of the four further obfuscated values corresponds to a possible combination of inputs and output of the logic gate. The four further obfuscated values may be derived in a manner similar to that shown in Table 3 below for logic gate 512, an AND gate, of FIG. 5. The value g may be any suitable value that is unique to the logic gate, such as a gate identifier (e.g., gate number) and $\oplus$ may stand for a logical exclusive or operation.

TABLE 3

| wire i | wire j | wire k | Further obfuscated values |
|--------|--------|--------|---------------------------|
| $w_i^0$ | $w_j^0$ | $w_k^0$ | $\text{Hash}(w_i^0 \| w_j^0 \| g) \oplus w_k^0$ |
| $w_i^0$ | $w_j^1$ | $w_k^0$ | $\text{Hash}(w_i^0 \| w_j^1 \| g) \oplus w_k^0$ |
| $w_i^1$ | $w_j^0$ | $w_k^0$ | $\text{Hash}(w_i^1 \| w_j^0 \| g) \oplus w_k^0$ |
| $w_i^1$ | $w_j^1$ | $w_k^1$ | $\text{Hash}(w_i^1 \| w_j^1 \| g) \oplus w_k^1$ |

In the exemplary case for logic gate 512, the user device may send four further obfuscated values, $\text{Hash}(w_i^0\|w_j^0\|)\oplus w_k^0$, $\text{Hash}(w_i^0\|w_j^1\|g)\oplus w_2^0$, $\text{Hash}(w_i^1\|w_j^0\|g)\oplus w k_k^0$, and $\text{Hash}(w_i^1 \| w_j^1 \| g) \oplus w_k^1$, as well as gate identifier g, to the access device. As shown in Table 3 above, $\text{Hash}(w_i^0 \| w_j^0 \| g) \oplus w_k^0$ may correspond to the case in which the input of wire i is $w_i^0$ and the input of wire j is $w_j^0$, $\text{Hash}(w_i^0 \| w_j^1 \| g) \oplus w_k^0$ may correspond to the case in which the input of wire i is $w_i^0$ and the input of wire j is $w_j^1$, $\text{Hash}(w_i \| w_j^0 \| g) \oplus w_k^0$ may correspond to the case in which the input of wire i is $w_i^1$ and the input of wire j is $w_j^0$, and $\text{Hash}(w_i^1 \| w_j^1 \| g) \oplus w_k^1$ may correspond to the case in which the input of wire i is $w_1^1$ and the input of wire j is $w_j^1$. The user device may send the four further obfuscated values in random order, such that the access device cannot determine which combination of inputs for wire i and wire j were utilized to derive each of the further obfuscated values. Thus, in some implementations, the user device may send the access device four further obfuscated values for each logic gate, as well as information indicating how the logic gates in the obfuscated circuit are connected to each other.

In some embodiments, the user device may additionally send check values to the access device. These check values can enable the access device to determine which recovered obfuscated value is the correct one to use. For example, the user device may send a pair of values $\text{Hash}(x \| r)$ and r for an obfuscated value x, where r may be a unique random value. A method of utilizing these check values is described with respect to step 212.

At step 206, the access device may receive authentication information input by the user. It is noted that step 206 may be conducted at any suitable time after step 201 (e.g., before steps 202, 203, 204, or 205) and is not limited to following the order of steps in flow 200. In some embodiments, the user may input the authentication information into an authentication information reader device of the access device to conduct an authentication process. The authentication information may be of the same type as the enrollment information input during step 201. For example, the authentication information may include biometric information and the authentication information reader device may be a biometric reader.

In one exemplary case, the user may place their finger on the authentication information reader device, which may read fingerprint data associated with the user's finger. The user device may then generate a digital reference associated with the fingerprint data. In some cases, the digital reference may be known as an authentication template. The authentication template may store the fingerprint data determined during the authentication process in any suitable format, such as by any suitable combination of numbers, strings, matrices, coordinates, and other data that can uniquely represent the fingerprint data.

At step 207, the access device may receive the information associated with the obfuscated circuit from the user device. As described above with respect to step 205, this information may include further obfuscated values for each logic gate, check values corresponding to each of the obfuscated values, as well as information indicating how the logic gates in the obfuscated circuit are connected to each other. The check values for an obfuscated value x may include $\text{Hash}(x \| r)$ and r, where r may be a unique random value.

After determining the authentication template based on the authentication information received at step 206 and receiving the information associated with the obfuscated circuit at step 207, the access device may want to evaluate the obfuscated circuit utilizing the authentication template as its input. However, while the authentication information may be made up of non-obfuscated values, the obfuscated circuit is meant to take obfuscated values as its inputs (e.g., $w_i^0$ or $w_i^1$ for wire i of obfuscated circuit 550 in FIG. 5) rather than non-obfuscated values (e.g., 0 or 1 for wire i of circuit 510 in FIG. 5). Thus, a translation of the authentication information into obfuscated authentication information occur prior to evaluation of the obfuscated circuit. The translation process is described in detail below with respect to steps 208 to 211. It is noted that in some embodiments, steps 208 to 211 may be conducted at any suitable time after step 206 occurs, such as before step 207.

At step 208, the access device may send a request to translate the authentication information into obfuscated authentication information. In some cases, the obfuscated authentication information can be expressed as one or more obfuscated values that can be input into the wires of the obfuscated circuit. For example, if a portion of the authentication information corresponding to wire i of obfuscated circuit 550 in FIG. 5 has a value of 0, the obfuscated authentication information may indicate that the corresponding obfuscated value is $w_i^0$. One of the benefits of utilizing the obfuscated authentication information instead of the authentication information directly is increased security, since the access device does not have to reveal the authentication information to the user device or any intermediary during transmission.

At step 209, the user device may receive the request to translate the authentication information into obfuscated authentication information. This may cause the user device to initiate a process involving an oblivious transfer protocol conducted between the user device and the access device. The process may enable the user device to send obfuscated authentication information to the access device at step 210 and the access device to receive the obfuscated authentication information at step 211. Steps 210 and 211 may involve multiple messages sent back and forth between the user device and the access device. In some embodiments, the user device may send, to the access device, the obfuscated authentication information in parts, and the access device may similarly receive, from the user device, the obfuscated authentication information in parts.

Some reasons for utilizing the oblivious transfer protocol for these steps are described below. One reason may be that the access device can receive the obfuscated authentication information without the access device having to reveal the authentication information to the user device. Another reason may be that the access device can receive the obfuscated authentication information without the user device having to reveal all obfuscated values associated with each wire of the obfuscated circuit to the access device. For example, for wire i of obfuscated circuit 550 in FIG. 5, the access device may only be able to recover either $w_i^0$ or $w_i^1$ corresponding to the authentication information, rather than receiving both possible obfuscated values that can be input into wire i. Thus, utilizing the oblivious transfer protocol can enable the user device to provide the access device with the requested information without either device having to send or receive extraneous information. This can prevent a malicious entity (e.g., a dishonest access device) from gathering enough information to potentially intercept or utilize sensitive information (e.g., configuration of circuit, value of enrollment template, value of authentication template, etc.).

Figure 6:
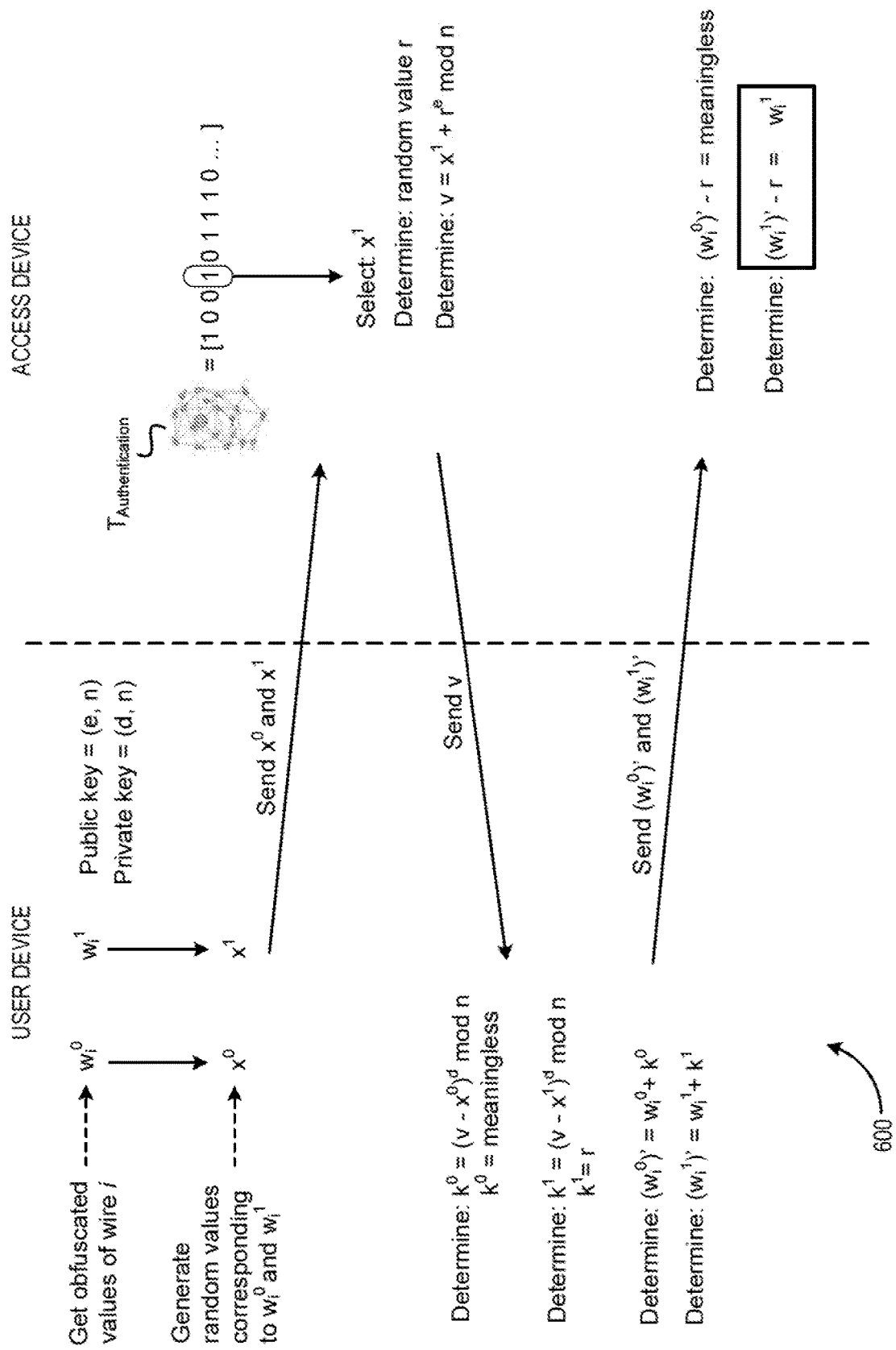
FIG. 6 shows an exemplary flow for performing a process involving an oblivious transfer protocol according to some embodiments of the invention.

Steps 210 and 211 are described with respect to FIG. 6, which shows an exemplary flow 600 for performing a process involving an oblivious transfer protocol according to some embodiments of the invention. Flow 600 shows an exemplary implementation of the one out of two oblivious transfer protocol as described in A randomized protocol for signing contracts (Even, Goldreich, and Lempel 1985).

However, it is understood that any other suitable implementation of an oblivious transfer protocol can replace or be combined with the shown process in order to perform steps 210 and 211.

Flow 600 may be performed between a user device and an access device. Flow 600 shows an exemplary process for enabling the access device to determine the obfuscated value $w_i^1$ that corresponds to an exemplary bit of $T_{Authentication}$ with a value of 1 (shown circled). $T_{Authentication}$ may be an authentication template determined based on authentication information input by a user into the access device and is shown in binary form (e.g., [1 0 0 1 0 1 1 1 0 . . . ]) in FIG. 6. The public key and private key associated with the user device shown in FIG. 6 may be generated using a suitable RSA algorithm, where in some embodiments, the values e, d, and n may be large integers. Flow 600 enables a series of computations such that the access device does not need to notify the user device that the bit has a value of 1, but is still able to recover the obfuscated value, $w_1^1$, corresponding to the value of 1 for the wire. Further, at the end of flow 600, the access device does not know the value of $w_i^0$, which may be the other possible obfuscated value corresponding the wire and associated with the value of 0. This increases security because extraneous information is not communicated between the user device and the access device. This decreases the chance that malicious entity can determine (e.g., intercept, derive, reverse-engineer, etc.) sensitive data, such as authentication information or additional information about the circuit.

In some embodiments, a process similar to flow 600 may be repeated for each bit of authentication template $T_{Authentication}$. It is noted that for each iteration performed, the obfuscated values associated with a wire (e.g., $w_i^0$ and $w_i^1$ in flow 600) and the randomly mapped values (e.g., $x^0$ and $x^1$ in flow 600) may be updated based on the wire corresponding to the bit being processed. It is noted that the user device may recognize which input wire is associated with the bit being translated, such as that wire i corresponds to fourth bit of $T_{Authentication}$ for flow 600, based on information related to the obfuscated circuit received in step 205. Further, while flow 600 shows the access device selecting $x^1$ for a bit of value 1, it is understood that the access device may select $x^0$ for a bit of value 0. After performing the process for each bit, the access device may possess the obfuscated authentication information, which can include a plurality of obfuscated values corresponding to the authentication information. The obfuscated values may represent inputs into an obfuscated circuit generated by the user device.

Referring back to FIG. 2, at step 212, the access device may evaluate the obfuscated circuit to determine an obfuscated authentication result. The access device may evaluate the obfuscated circuit based on the obfuscated authentication information received at step 211. Evaluating the obfuscated circuit may involve evaluating each gate in the obfuscated circuit. An exemplary process for evaluating a gate is described below. It is understood that a similar process may be performed for each gate in the obfuscated circuit.

For demonstrative purposes, the process for evaluating a gate from the obfuscated circuit is described with respect to logic gate 512, an AND gate, of obfuscated circuit 550 shown in FIG. 5. Based on steps 205 and 207, the access device may have received a gate identifier g, as well as further obfuscated values associated with logic gate 512. These further obfuscated values may include Hash $(w_i^0 || w_j^1 || g) \oplus w_k^0$, Hash$(w_i^0 || w_j^0 || g) \oplus w_k^0$, Hash $(w_i^1 || w_j^0 || g) \oplus w_k^0$, and Hash$(w_i^1 || w_j^1 || g) \oplus w_k^1$ as shown in Table 3. Based on the oblivious transfer protocol in steps 210 and 211, the access device may have also received, from the user device, values $w_i^0$ and $w_j^1$ to be input into wire i and wire j of logic gate 512, respectively.

The access device may determine the appropriate obfuscated value, $w_k^0$ or $w_k^1$, corresponding to output wire k of logic gate 512 based on the information that it has received from the user device. First, the access device may determine the value Hash$(w_i^0 || w_j^1 || g)$. The access device may then perform an exclusive or operation of this value with each of the further obfuscated values, Hash $(w_i^0 || w_j^0 || g) \oplus w_k^0$, Hash $(w_i^0 || w_j^1 || g) \oplus w_k^0$, Hash$(w_i^1 || w_j^0 || g) \oplus w_k^0$, and Hash $(w_i^1 || w_j^1 || g) \oplus w_k^1$.

In other words, the access device may determine the following values:
Hash$(w_i^0 || w_j^1 || g) \oplus$ Hash$(w_i^0 || w_j^0 || g) \oplus w_k^0$,
Hash$(w_i^0 || w_j^1 || g) \oplus$ Hash$(w_i^0 || w_j^1 || g) \oplus w_k^0$,
Hash$(w_i^0 || w_j^1 || g) \oplus$ Hash$(w_i^1 || w_j^0 || g) \oplus w_k^0$), and
Hash$(w_i^0 || w_j^1 || g) \oplus$ Hash$(w_i^1 || W_j^1 || g) \oplus w_k^1$.

Out of the four operations, only one will recover a meaningful value that is equivalent to either $w_k^0$ or $w_k^1$. For example, out of the operations shown above, only Hash $(w_i^0 || w_j^1 || g) \oplus$ Hash$(w_i^0 || w_j^1 || g) \oplus w_k^0$ will recover the appropriate obfuscated value corresponding to wire k, which is equivalent to $w_k^0$ in this case. This is because the hash results are identical and thus are canceled out based on the exclusive or operation, leaving $w_k^0$.

In some embodiments, the access device may utilize check values received at step 207 to determine which of the four recovered values is the appropriate obfuscated value to be utilized for further evaluation of the obfuscated circuit. In this exemplary case regarding determining the appropriate obfuscated value $w_k^0$ for wire k, a pair of check values, Hash$(w_k^0 || r)$ and r, where r may be a unique random value, may allow the access device to determine which of the four recovered values is equal to $w_k^0$. After receiving a candidate obfuscated value x', the access device may determine Hash (x'||r) and compare the result with the check value Hash $(w_k^0 || r)$. If the hashed values match, this can confirm that the obfuscated value was recovered properly and can be utilized for further computation.

The access device may continue to evaluate individual gates in the obfuscated circuit in order to determine the obfuscated result. For example, the access device may perform similar operations to those described above for logic gate 516 to determine an obfuscated value corresponding to wire c, and then subsequently evaluate logic gate 514 based on the obfuscated value determined for wire c and $w_k^0$ as the input for wire k. Eventually, after all of the individual gates have been evaluated, the access device may determine the obfuscated authentication result of the obfuscated circuit.

Depending on how the obfuscated circuit is configured, the format of the corresponding obfuscated authentication result may vary. In some implementations, the obfuscated circuit may comprise one overall output wire, where the obfuscated authentication result may be an obfuscated value corresponding to the output wire. In some embodiments, this format may be implemented for an authentication function that indicates a binary result (e.g., match or no match). In other implementations, the obfuscated circuit may comprise a plurality of output wires, where the obfuscated authentication result may thus include a plurality of obfuscated values, each corresponding to one of the plurality of output wires. In some embodiments, this format may be implemented for an authentication function that indicates a value within a range (e.g., match value between 0-99%).

At steps 213 and 214, the access device may send the obfuscated authentication result to the user device, which may subsequently receive the obfuscated authentication result. The transmission of the obfuscated authentication result from the access device to the user device is secure because an intermediary would not be able to derive any meaningful information based on intercepting the obfuscated authentication result. To them, the obfuscated authentication result would look like one or more random values. Further, since an authentication result (e.g., match or no match, match value between 0-99%, etc.) cannot be determined based on just knowing the obfuscated authentication result, a rogue access device would not be able to reverse engineer an enrollment template associate with the user.

At step 215, the user device may determine whether the user is authenticated based on the obfuscated authentication result. For example, the user device may determine an authentication result based on the one or more obfuscated values of the obfuscated authentication result. First, the user device may look up information in the stored mappings between obfuscated values and non-obfuscated values corresponding to wires of the obfuscated circuit. Based on the mappings, the user device may determine the non-obfuscated values associated with the one more obfuscated values included in the obfuscated authentication result. The user device may then determine the authentication result based on the determined non-obfuscated values.

In an exemplary case in which the obfuscated authentication result includes just one obfuscated value, the user device may look up the corresponding non-obfuscated value, which may be 0 or 1. In some cases, the value 0 may indicate that the user cannot be authenticated, since the enrollment template and the authentication template did not match based on the authentication function. On the other hand, the value 1 may indicate that the user can be authenticated, since the enrollment template and the authentication did match based on the authentication function.

In another exemplary case in which the obfuscated authentication result includes a plurality of obfuscated values, the user device may look up the corresponding non-obfuscated values, which may be 0 or 1, for each of the plurality of obfuscated values. In some implementations, the plurality of non-obfuscated values may be processed in order to determine whether the user can be authenticated. For example, the plurality of non-obfuscated values may be concatenated to form a string of bits that indicate a number in binary format as shown in FIG. 7.

Figure 7:
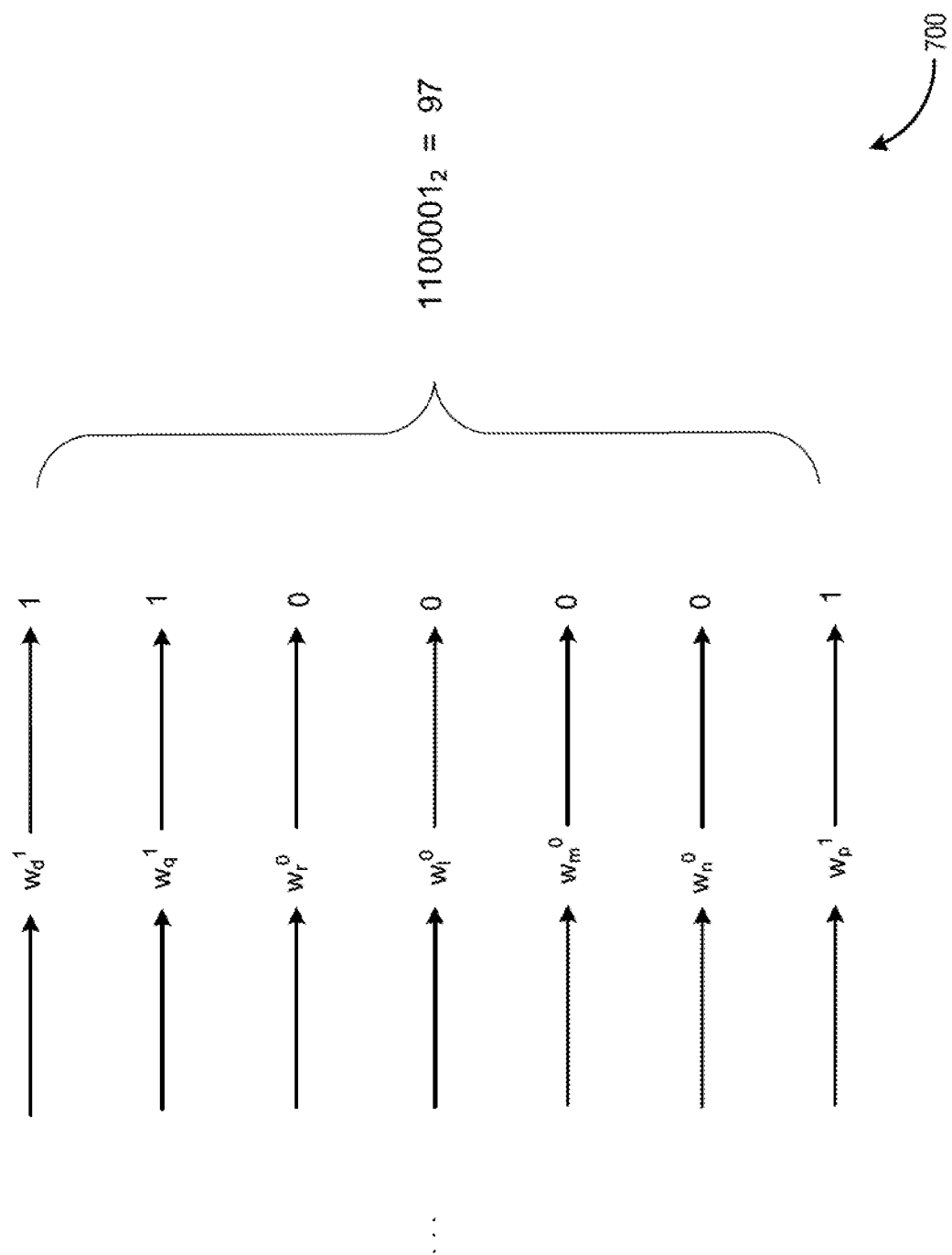
FIG. 7 shows an exemplary flow for determining an authentication result according to some embodiments of the invention.

FIG. 7 shows an exemplary flow 700 for determining an authentication result according to some embodiments of the invention. FIG. 7 shows an obfuscated authentication result comprising a plurality of obfuscated values $w_d^1$, $w_q^1$, $w_r^0$, $w_l^0$, $w_m^0$, $w_n^0$, and $w_p^1$, which are determined to be associated with real vales 1, 1, 0, 0, 0, 0, 1, respectively. These non-obfuscated values may be concatenated to form a string of bits "1100001" indicating the value 97 in binary format. This may indicate that the authentication function output a value of 97 based on the enrollment template and authentication template. In some implementations, this authentication result may indicate that there is a 97% match between the enrollment template and the authentication template. In other implementations, this authentication result may indicate that there is a 97% chance that the source (e.g., user) from which the enrollment template and the authentication template originated is the same. The user device may determine whether this value indicates that the user is authenticated (e.g., based on rules, comparing against a threshold value, etc.).

At step 216, the user device may initiate appropriate actions based on the authentication decision determined in step 215. If the user device determined that the user cannot be authenticated, the authentication process may be terminated. In some cases, terminating the authentication process may comprise disabling the wireless connection between the user device and the access device. Additionally, if the user device determined that the user can be authenticated, the user device may proceed to step 217.

At step 217, the user device may initiate a request for access. For example, the user device may initiate a request to access a resource from the access device. In some embodiments, the request may be for accessing a location (e.g., inside of a building), services (e.g., money deposit or withdrawal, etc.), physical items (e.g., delivery package, product, object, etc.), electronic data (e.g., electronic documents, electronic files, electronic information, audio data, etc.), or other suitable resources. In some cases, the user device may send information with the request to the access device. In some embodiments, the information may include one or more of a user identifier (e.g., user ID, name, etc.), account identifier (e.g., card number), a token associated with an account identifier (e.g., payment token), a password, a PIN, or other data. It is understood that the user device may be capable of storing the information and sending it to the access device without user input. However, in some cases, step 217 may be implemented utilizing user input such that the user device prompts the user for confirmation to transmit the information before sending the information to the access device.

At step 218, upon receiving the request from the user device, the access device may fulfill the request. In some embodiments, fulfilling the request may comprise providing the user device or the user operating the user device access to a resource. In some cases, the access device may enable the user to enter a building (e.g., by unlocking an entrance), to receive physical items or electronic data (e.g., delivery package, product, object, etc.), or conduct a transaction using their account (e.g., deposit, withdrawal, etc.).

Unlike conventional systems implementing secure multi-party computation, embodiments of the invention enable the user device and the access device to forgo some cryptographic computations, which improves efficiency. For example, after the user device decrypts the obfuscated authentication result, the user device may send the authentication result to the access device. Typically, there is a mechanism needed to ensure that the user device truthfully reported the authentication result to the access device. However, in embodiments of the invention, this extra cryptographic step can be eliminated without compromising security because there is no risk in the user device reporting the incorrect authentication result. For example, in some contexts, such as when performing a payment process, if the authentication result is negative (e.g., no match, or numeric result below threshold, etc.), reporting the incorrect authentication result may be irrelevant, since the user device would not initiate a request for access anyway. If the authentication result is positive (e.g., match, numeric result equal to or above threshold, etc.), reporting the incorrect authentication result to the access device would at worst result in the request for access not being initiated. Thus, embodiments of the invention eliminate some cryptographic computations that would typically be necessary to prove to the access device that the authentication result was reported truthfully by the user device.

While an exemplary embodiment is described in detail above, it is understood that in some other contexts, reporting the incorrect authentication result to another entity may be appropriate. For example, when requesting access to a location, the user operating the user device may still be interested to gain access despite receiving a negative authentication result. In such cases, the incorrect authentication result may be reported to an entity (e.g., entity associated with the access device) in order to initiate further steps to receive access. For example, the user may notify a security guard of the negative authentication result and then proceed to provide other forms of identification in order to gain access into a building.

Embodiments of the invention enable an authentication process to be performed more efficiently without compromising security. While conventional systems attempt to avoid the time-consuming process of inputting multiple pieces of information each time an authentication process is performed by authenticating users against authentication information previously stored in remote systems, this can result in reduced security. For example, this leaves a risk that authentication information can be stolen at rest or in transmission. In contrast, embodiments of the invention utilize obfuscated values associated with the authentication information instead of the authentication information itself. Any obfuscated values that may be intercepted by a malicious entity are meaningless and cannot be utilized to derive authentication information. Thus, embodiments of the invention can enable the user to conduct a "hands-free" authentication process, such that they do not have to type information into their user device or the access device, without reduced security as in conventional systems.

It is understood that flow 200 described above can be implemented between a user device and an access device that may communicate with each other over any suitable wireless connection. For example, the user device and the access device may be in communication over a local wireless connection or a remote connection. In the former case, the user may be in physically located near the access device and may possess their user device. The access device may communicate with the user device over the local wireless connection. In the latter case, the user may be in a location remote from the access device. However, the user may possess their user device and may be utilizing an intermediary device (e.g., computer) in communication with the access device in order to conduct the authentication process.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems in a computer system may be interconnected via a system bus. Additional subsystems can include a printer, keyboard, storage device(s), monitor, which is coupled to a display adapter, and others. Peripherals and input/output (I/O) devices, which couple to an I/O controller, can be connected to the computer system by any number of means known in the art such as an input/output (I/O) port (e.g., USB,)FireWire®. For example, the I/O port or external interface (e.g. Ethernet, Wi-Fi, etc.) can be used to connect the computer system to a wide area network such as the Internet, a mouse input device, or a scanner. An interconnection via system bus can allow the central processor to communicate with each subsystem and to control the execution of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method comprising:
    determining, by a first device, an obfuscated circuit;
    receiving, by the first device, a request for obfuscated authentication information;
    sending, by the first device and via an oblivious transfer protocol, obfuscated values to a second device to enable the second device to translate authentication information input by a user to the second device into obfuscated authentication information;
    receiving, by the first device, an obfuscated authentication result from the second device, wherein the obfuscated authentication result is determined by the second device evaluating the obfuscated circuit for the obfuscated authentication information; and
    determining, by the first device, whether the user is authenticated based on the obfuscated authentication result.

2. The method of claim 1, wherein determining the obfuscated circuit comprises:
    determining, by the first device, enrollment information input by the user;
    determining, by the first device, an authentication function that evaluates whether the user is authenticated based on the enrollment information and the authentication information;
    determining, by the first device, a circuit representing the authentication function; and
    obfuscating, by the first device, values of the circuit to determine the obfuscated circuit associated with the circuit.

3. The method of claim 2, wherein the obfuscated circuit is valid for a set number of uses, and the first device is a mobile phone, and the second device is a point of sale terminal.

4. The method of claim 1, wherein determining whether the user is authenticated based on the obfuscated authentication result comprises:
    determining, by the first device, one or more non-obfuscated values associated with the obfuscated authentication result;
    determining, by the first device, an authentication result based on the one or more non-obfuscated values; and
    determining, by the first device, whether the user is authenticated based on the authentication result.

5. The method of claim 4, wherein the authentication result indicates a degree to which the authentication information matches enrollment information.

6. The method of claim 1, wherein the authentication information includes biometric information.

7. The method of claim 1, wherein the obfuscated circuit comprises a plurality of connected logic gates, each of the plurality of connected logic gates are associated with a gate identifier, wherein the obfuscation values include the gate identifier.

8. The method of claim 1, further comprising:
    providing, by the first device to the second device, information associated with the obfuscated circuit.

9. The method of claim 8, wherein the information associated with the obfuscated circuit comprises obfuscated values for logic gates in the obfuscated circuit and information indicating how the logic gates in the obfuscated circuit are connected to each other.

10. A method comprising:
    receiving, by a second device, authentication information input by a user;
    receiving, by the second device from a first device, information associated with an obfuscated circuit;
    sending, by the second device, a request for obfuscated authentication information to the first device, the first device initiating a process with the second device, the process involving an oblivious transfer protocol between the first device and the second device;
    receiving, by the second device via the oblivious transfer protocol, from the first device, obfuscated values to enable the second device to translate the authentication information into obfuscated authentication information;
    evaluating, by the second device, the obfuscated circuit for the obfuscated authentication information to determine an obfuscated authentication result; and
    sending, by the second device, the obfuscated authentication result to the first device, wherein the user is authenticated based on the obfuscated authentication result.

11. The method of claim 10, wherein the first device and the second device communicate over a local network connection.

12. The method of claim 10, wherein the obfuscated circuit comprises a plurality of connected logic gates are associated with a gate identifier.

13. A device comprising:
    a processor; and
    a computer-readable medium coupled to the processor, the computer-readable medium including code executable by the processor for performing operations comprising:
    determining an obfuscated circuit;
    sending a request for obfuscated authentication information;
    sending, via an oblivious transfer protocol, obfuscated values to a second device, to enable the second device to translate authentication information input by a user to the second device into obfuscated authentication information;

receiving, an obfuscated authentication result from the second device, wherein the obfuscated authentication result is determined by the second device evaluating the obfuscated circuit for the obfuscated authentication information; and determining whether the user is authenticated based on the obfuscated authentication result.

14. The device of claim 13, wherein determining the obfuscated circuit comprises:

determining enrollment information input by the user;

determining an authentication function that evaluates whether the user is authenticated based on the enrollment information and the authentication information;

determining a circuit representing the authentication function; and obfuscating values of the circuit to determine the obfuscated circuit associated with the circuit.

15. The device of claim 14, wherein the obfuscated circuit is valid for a set number of uses.

16. The device of claim 13, wherein determining whether the user is authenticated based on the obfuscated authentication result comprises:

determining one or more non-obfuscated values associated with the obfuscated authentication result;

determining an authentication result based on the one or more non-obfuscated values; and determining whether the user is authenticated based on the authentication result.

17. The device of claim 16, wherein the authentication result indicates a degree to which the authentication information matches enrollment information.

18. The device of claim 13, wherein the authentication information includes biometric information.

19. The device of claim 14, wherein the obfuscated circuit comprises a plurality of connected logic gates, each of the plurality of connected logic gates are associated with a gate identifier, wherein the obfuscation values include the gate identifier.

20. The device of claim 13, wherein the operations further comprise:

providing, to the second device, information associated with the obfuscated circuit, wherein the information associated with the obfuscated circuit comprises obfuscated values for logic gates in the obfuscated circuit and information indicating how the logic gates in the obfuscated circuit are connected to each other.

* * * * *